United States Patent [19] [11] 4,115,144
Chambers et al. [45] Sep. 19, 1978

[54] METHOD OF PREPARING METAL OXIDE SLURRIES

[75] Inventors: Hubert Harold Chambers, Waltham; Brian John Tear, Grimsby, both of England

[73] Assignee: Laporte Industries Limited, London, England

[21] Appl. No.: 746,674

[22] Filed: Dec. 2, 1976

[30] Foreign Application Priority Data

Dec. 23, 1975 [GB] United Kingdom ............... 52512/75

[51] Int. Cl.$^2$ .............................................. C09C 1/36
[52] U.S. Cl. ............................... 106/300; 106/308 B; 106/309
[58] Field of Search ...................... 106/300, 308 B, 309

[56] References Cited

U.S. PATENT DOCUMENTS

| | | | |
|---|---|---|---|
| 3,410,708 | 11/1968 | McGinnis | 106/300 |
| 3,459,575 | 8/1969 | Andrew et al. | 106/300 |
| 3,510,334 | 5/1970 | Goodspeed | 106/300 |
| 3,847,640 | 11/1974 | Daubenspeck et al. | 106/308 B |

Primary Examiner—Winston A. Douglas
Assistant Examiner—J. V. Howard
Attorney, Agent, or Firm—Kane, Dalsimer, Kane, Sullivan and Kurucz

[57] ABSTRACT

A high solids metal oxides coated titanium dioxide aqueous slurry requires a negative charge and a high pH for use in aqueous paint media. A hot ageing of the coated titanium dioxide can alter the isoelectric point of the slurry and make practicable the avoidance of mixtures of metal oxide coating agents which give rise to processing difficulties and the use of mixtures of metal oxides which would not without the hot ageing step give suitable charge and pH characteristics. An example of a suitable mixture of metal oxide coating agents is a 1:1 molar $Al_2O_3 : TiO_2$ mixture. An example of hot ageing conditions is the use of a temperature of 98° C – 100° C for 1 hour while avoiding loss of water and under alkaline conditions.

13 Claims, No Drawings

METHOD OF PREPARING METAL OXIDE SLURRIES

BACKGROUND OF THE INVENTION

1. Field of the Invention

This invention relates to aqueous metal oxide slurries and particularly to aqueous titanium dioxide slurries.

2. Brief Description of the Prior Art

Stable high solids concentration aqueous titanium dioxide slurries suitable for direct incorporation into aqueous paint or paper media represent the possibility of large savings in costs to the paint manufacture in comparison with the use of dry titanium dioxide powder. These slurries must have a solids content greater than 60% and a low viscosity which does not change substantially on storage. Such slurries have been produced by pigment manufacturers from dry titanium dioxide powder with the aid of a wide variety of dispersing agents and viscosity stabilisers and give sufficient dispersion stability for use after transport and storage.

The production of these slurries has transferred the step of dispersion from the paint manufacturer to the pigment manufacturer so that the cost of manufacturing the pigment is necessarily increased.

Titanium dioxide, produced either by the vapour phase oxidation of titanium tetrachloride, or by the hydrolysis of aqueous solutions containing titanium sulphate to produce hydrous titanium dioxide followed by calcination hereafter referred to as the "sulphate process", is generally treated by forming a dispersion of the titanium dioxide in water and precipitating hydrous metal oxides in the dispersion to form a coating thereof on the titanium dioxide which is then recovered and dried to produce a final pigmentary product. A considerable reduction of energy consumption could be achieved if it were possible to produce a high solids concentration titanium dioxide slurry or a proportion thereof directly from the wet treated pigment, omitting or minimising the drying step, and it would also be a considerable advance in the art if the use of dispersing agents could be avoided or minimised.

Aqueous paint media are usually alkaline and negatively charged and it is for this reason that the titanium dioxide slurry, to be compatible with such media, requires a negative charge. In practice the slurry should have as high a negative charge and as high a pH as practicable, preferably a pH of at least 9.2 although at above a pH of about 10.5 any alumina present on the titanium dioxide particles may dissolve. The negative charge of the slurry at a given pH is related to the isoelectric point of the slurry, that is, the pH at which the charge is zero, and the lower the isoelectric point the higher the negative charge at a given alkaline pH. The isoelectric point is a property of the surface of the particles of the titanium dioxide in the slurry and may be controlled by coating the surface with metal oxides. For example, a coating of alumina gives an isoelectric point at a pH of 9.2 and a coating of titania gives an isoelectric point at a pH of 4.2. A homogeneous mixed alumina/titania coating gives an intermediate isoelectric point.

The composition of the metal oxide coating also affects the physical nature of a slurry of the coated titanium dioxide in other ways and, for example, a dispersion of titanium dioxide having a coating substantially consisting of hydrous titania is very difficult to filter and wash. The ease of filtering improves if a larger proportion of hydrous alumina is incorporated in the coating but at higher proportions of alumina the isoelectric point increases so that the pigment is less negatively charged at a given pH and is less suitable for incorporation in aqueous paint media. The manufacture of titanium dioxide slurries suitable for incorporation in aqueous paint media by processes involving coating the titanium dioxide with metal oxides is, therefore, subject to a combination of problems and an attempt to alleviate one only serves to exacerbate the others.

We have found that the properties of a metal oxide coated titanium dioxide can be altered after precipitation by ageing at an elevated temperature so as to produce in at least some circumstances, titanium dioxide which is capable of forming a slurry more suitable for incorporation in aqueous paint media than might have been expected. Without being so limited we believe that this may be due to an alteration in the isoelectric point of the slurry as a result of the effect of the hot ageing step on the surface properties of the coated titanium dioxide particles.

SUMMARY OF THE INVENTION

According to one aspect, the present invention provides a process for the production of an aqueous high solids concentration titanium dioxide slurry comprising precipitating a mixed metal oxide coating onto particles of titanium dioxide dispersed in water to produce a filterable dispersion of coated titanium dioxide, raising the concentration of the coated titanium dioxide to at least that required in the product and forming an aqueous slurry of the coated titanium dioxide at the desired product concentration, the coated titanium dioxide being subjected after at least a first filtration and washing step to a "hot ageing" step, the proportion and composition of the metal oxides in the coating being such that a slurry of the aged titanium dioxide has a negative charge.

DETAILED DESCRIPTION OF THE INVENTION

In the practice of this invention the titanium dioxide coated may be undried product recovered directly from wet milling or hydroclassification processes.

The term "metal oxide" is used herein to include hydrous oxides and hydroxides of the metal. Suitable metals may be selected from aluminium, antimony, beryllium, cerium, hafnium, lead, niobium, silicon, tantalum, tin, titanium, zinc and zirconium. It is preferred that, if the slurry is to be incorporated in aqueous paint media, to select at least one metal oxide from the class of metal oxides giving an isoelectric point greater than 7 and at least one from the class of metal oxides giving an isoelectric point less than 7, examples of which are shown in Table 1.

TABLE 1

| Isoelectric Point | |
|---|---|
| >7 pH | <7 pH |
| aluminum | Cerium |
| Beryllium | Antimony |
| Lead | Silicon |
| Zinc | Titanium |
| | Zirconium |
| | Tin |

Very suitably a combination of aluminium and titanium is used, and the metal oxides, hydroxides or hydrous oxides precipitated as titania and alumina.

Where a combination of alumina and titania are used to coat the titanium dioxide particles, a molar ratio of aluminium to titanium of from 0.5 to 1.25 and preferably from 0.6 to 1.2 for example is substantially equal quantities on a molar basis gives a suitable combination of properties. For other combinations of metal oxides suitable relative proportions of the metal oxides may be determined by experimental optimisation bearing in mind the factors discussed above.

Since the function of the use of a mixed metal oxide coating is to control a surface property of the titanium dioxide it is necessary to ensure that the theoretically desired combination of metal oxides is present on that surface. If the metal oxides are deposited on the titanium dioxide successively the first metal oxide would tend to be masked by the second. To achieve the theoretically required ratio of metal oxides on the surface it will generally be necessary to coprecipitate the oxides from a solution containing them in admixture.

The precipitation of the mixed metal oxide coating may be conducted by known means. Suitable metal compounds precipitatable as oxides, hydrous oxides or hydroxides, or as compounds convertible to such under the conditions used, may be mixed by dissolving them in water, adding the solution to an aqueous dispersion of the titanium dioxide and precipitating the metal oxides, hydrous oxides or hydroxides. Suitable metal compounds are therefore soluble in water and, since final alkaline precipitation conditions are required, they suitably lend themselves to this by being precipitatable by addition of alkali, or by, for example, hydrolysis. Aluminium sulphate is a suitable aluminium compound from which alumina is precipitatable by the addition of suitable alkali such as sodium hydroxide. Titanium tetrachloride is a suitable titanium compound from which titania is precipitatable by hydrolysis.

The concentration of the solution of suitable metal compounds is preferably such as to provide a mixed metal oxide coating on the titanium dioxide of from 0.5% to 15% and, particularly from 1.0% to 10% by weight.

The particular pH at which the mixed metal oxides are hot aged has a bearing on the effectiveness of the hot ageing step. Preferably as high a final precipitation pH as possible, bearing in mind the tendency of alumina to dissolve at a pH above 10.5, should be used. Suitably the precipitation is conducted to a final pH of from 9 to 10.5. It is important that the precipitation of the mixed metal oxides be conducted in such a manner as to produce a coated pigment which may be filtered and washed. If the mixed metal oxide coating is aged to any substantial extent before the post-precipitation filtration and washing steps have been completed this may render the coated titanium dioxide extremely difficult to process further. The precipitation is therefore preferably conducted under conditions under which little or no ageing can occur and, in particular, at a relatively low temperature. Preferably the precipitation and at least the first post-precipitation filtration and washing steps is conducted at a temperature not above 40° C and, particularly preferably, at a temperature of from 10° C to 30° C. Preferably the hot ageing step according to the invention is conducted after the post precipitation filtration and washing steps have been completed The coated titanium dioxide resulting from the mixed metal oxide precipitation step may be recovered by filtration and washed. It may then be in the form of a filter cake having a solids content of up to about 55% by weight and giving an alkaline reaction. The addition of any substances to the washed titanium dioxide which might reduce its alkalinity should be avoided. The solids content of the slurry product should be above 60% and desirably from 65% to 75% by weight. It is therefore necessary to raise the concentration of the solids and this may be accomplished by any of a variety of known means such as by high pressure filtration, by blending in a portion of suitably coated pigment which has been dried or by allowing some of the water present to evaporate either under reduced pressure at relatively low temperatures or in the course of the hot ageing step.

The hot ageing of the coated and washed titanium dioxide may be performed after raising the solids concentration to the desired product concentration or above or, if this does not interfere with the process of raising the concentration, for example by causing filtration problems, before the solids concentration has been raised to, or after it has been raised part of the way towards, the desired product concentration.

The washed titanium dioxide is "hot aged" by which we mean that it is maintained for a time at an elevated temperature in the presence of water under alkaline conditions.

The hot ageing step is preferably conducted at a temperature from 40° C to 100° C for a duration of at least 20 minutes and particularly preferably of at least 30 minutes. Since the duration of the hot ageing step may be decreased if a relatively higher temperature is used and, since, if the temperature is not above the boiling point of water, the precautions required to prevent drying out are less onerous, the hot ageing step is suitably conducted at a temperature of from 80° C to 100° C. At such temperatures a duration of from about 30 minutes to about 2 hours may suffice. At lower temperatures it may be necessary to conduct the ageing step for a longer duration for example, for from 2 hours to 24 hours. Preferably the hot ageing step is conducted so as to reduce the isoelectric point of a slurry of the coated titanium dioxide by at least 1.0.

The aged titanium dioxide, if it has a concentration above the required product concentration may be adjusted to, the desired product concentration by the addition of water and redispersed by means of high shear mixing and, possibly, wet milling. Although this addition of water aids redispersion, it may not be essential. Preferably the isoelectric point of a slurry of the aged titanium dioxide is from 4.5 to 5.9.

The invention will now be illustrated by means of the following examples.

EXAMPLE 1

Titanium dioxide produced by the sulphate process was dispersed in water with the aid of sodium silicate dissolved in the water at a concentration equivalent to 0.3% silica by weight of the titanium dioxide and the dispersion was wet milled to a particle size range of 93 – 97% < 0.5 microns and the milled pigment was subjected to hydroclassification to take material above 0.5 microns out.

3400 mls of the classified dispersion containing 1000 g titanium dioxide was subjected to surface coating with mixed metal oxides. An aluminium sulphate/titanium tetrachloride mixed electrolyte was produced by mixing 175 mls of an aqueous solution of titanium tetrachloride having a concentration equivalent to 163 g/l titanium dioxide with 347 mls of an aqueous solution of aluminium sulphate having a concentration equivalent to 105 g/l alumina. The electrolyte was added to the titanium dioxide dispersion over a period of 5 minutes with stirring, and was then allowed to equilibrate over a further period of 30 minutes, with stirring, at a temperature of 25° C. An aqueous solution of sodium hydroxide having a concentration of 100 g/l was then added to the dispersion over a period of 10 minutes, with stirring, until the pH of the dispersion was 10.5, and the dispersion was then stirred for a further 30 minutes during which time it was still maintained at a temperature of 25° C.

As a result of this treatment the titanium dioxide particles in the dispersion were coated in a 1:1 molar ratio with alumina and titania in a quantity sufficient to give a total loading of alumina and titania of 6.5 g on every 100 g titanium dioxide.

The dispersion of coated titanium dioxide particles was filtered and the filter cake was washed with 1600 mls of demineralised water after which it was repulped in 1600 mls of demineralised water, filtered once more, and washed once more with 1600 mls of demineralised water. The repulping, filtering and washing cycle was then repeated in the same manner. No filtration or wash problems were encountered.

The filter cake thus produced had a solids content of 52% and liquified easily on agitation or under mild shear to produce a suspension having a pH of 10.5 and a specific conductance of 450 micromhos/cm at 25° C.

The 52% suspension was filtered under high pressure to give a filter cake having a solids content of 70% by weight. This filter cake was broken up, and ballmilled in the presence of sufficient added demineralised water to lower the concentration of the suspension to 65% by weight so as to break up any lumps of cake. The milled suspension having a stiff consistency was aged by heating at 98° to 100° C for 1 hour while avoiding the loss of evaporated water. The resulting aged slurry had the consistency of thin cream and was still stable at the end of 3 months. It has a negative charge.

EXAMPLES 2 to 7

These examples were conducted using the procedure of Example 1 except as noted specifically hereunder (line references are to the lines in Table II). The quantities of aluminium sulphate and aluminium chloride were varied in each example to give the same total coating weight but a different ratio $Al_2O_3$ to $TiO_2$ in the coating as summarised in line (a). The total time taken to filter and wash the coated titanium dioxide and the solids content of the filter cake so obtained are indicated in lines (b) and (c) and certain properties of this filter cake are indicated in lines (d) - (f). This filter cake was liquified by stirring and the apparent viscosity was measured on a Brookfield and the results are indicated is line (g). A high pressure filter cake was produced-line (h) and with high shear mixing, the minimum quantity of water added to achieve disintegration of the cake and the disintegrated cake had the concentration indicated in line (i). The resulting slurry was hot aged as in Example 1 and the isoelectric point after ageing is indicated in line (j). The apparent viscosity of the hot aged slurry adjusted to 65% w/w solids was measured at various shear rates, initially and after 7 months storage in a stoppered bottle, with no agitation and the results are indicated in lines (k). Any change in the isoelectric point, and the pH of the stored slurry are indicated in lines (l) and (m). In certain instances it was not possible to measure the Weisenberg viscosity. The stored product of Example 4 was a stiff gel. Comments on the hot aged product of each of the examples are as follows:

Example 2: Initially — creamy consistency — flowed freely when container was inverted. After storage — had set to a thixotropic gell which could be liquified by gentle stirring — No sign of hard settlement.

EXAMPLE 3: Initially as Example 2.

After storage — set to stronger gel than Example 2 product but could still be liquified by stirring.

EXAMPLE 4: Initially — creamy and free flowing.

After 7 months — set to a stiff gel which was not easily liquified. No hard settlement.

TABLE II
PART A

| Example No. | 4 | 3 |
|---|---|---|
| a) $Al_2O_3/TiO_2$ molar ratio : 1 | 0.393 | 0.61 |
| b) Total time for filtration and washing (mins) | 157 | 76 |
| c) Solids content of filtercake % | 53.4 | 46.6 |
| d) Specific conductance of filter cake (micromhos cm$^{-1}$) | 650 | 520 |
| e) pH of filtercake | 10.75 | 10.75 |
| f) Isoelectric point of filter cake | 5.0 | 6.7 |
| g) Apparent Brookfield Viscosity of liquified filtercake (poises) | 0.2 | 0.3 |
| h) High pressure filtercake (solids %) | 70 | 70 |
| i) Disintegrated filtercake (solids %) | 70 | 68.5 |
| j) Isoelectric point after heat treatment | 4.2 | 4.8 |

| | EXAMPLE NUMBER | | | |
|---|---|---|---|---|
| | 2 | 5 | 6 | 7 |
| a | 1.0 | 1.5 | 2 | ∞ |
| b | 79 | 79 | 89 | 288 |
| c | 47 | 44.8 | 44.9 | 45.2 |
| d | 440 | 300 | 470 | 450 |
| e | 10.65 | 10.4 | 10.3 | 9.1 |
| f | 7.1 | 7.7 | 8.0 | 9.2 |
| g | 1.6 | 2.7 | 12.5 | 50 |
| h | 70 | 70 | 70 | just less than 70 |
| i | 65 | 58 | 49.5 | 40 |
| j | 5.6 | 5.95 | 6.6 | 8.6 |

TABLE II
PART B

| Example No. | 4 | | 3 | |
|---|---|---|---|---|
| | Init. | 7 mths. | Init. | 7 mths. |
| Apparent Weissenberg Viscosity (Poises) of 65% slurry | | | | |
| k) initially and after 7 months, at shear rate of 1125 sec.$^{-1}$ | 1.29 | | 0.36 | 0.66 |
| k) "895.5 sec.$^{-1}$ | 0.33 | gel | 0.43 | 0.80 |
| k) "710 sec.$^{-1}$ | 0.37 | not | 0.50 | 1.18 |
| k) "564 sec.$^{-1}$ | 0.44 | mea- | 0.61 | 1.77 |
| k) "449 sec.$^{-1}$ | 0.52 | sure- | 0.73 | 2.43 |
| k) "356 sec.$^{-1}$ | 0.61 | able | 0.88 | 3.00 |
| k) "225 sec.$^{-1}$ | 0.83 | | 1.18 | 4.80 |
| k) "112.5 sec.$^{-1}$ | 1.39 | | 2.1 | 11.1 |
| l) Isoelectric point after 7 months storage | no change | | | |
| m) pH after 7 months storage | 9.0 | | 9.2 | |

| | EXAMPLE NUMBER | | | | | | | |
|---|---|---|---|---|---|---|---|---|
| | 2 | | 5 | | 6 | | 7 | |
| | Init. | 7 mths. | Init. | 7 mths. | Init. | 7 mths. | Init. | 7 mths |
| k) | 0.33 | 0.47 | not measured since it was not possible to produce a slurry by disintegrating the filtercake having a solids content of the desired minimum level of 60%. | | | | | |
| | 0.40 | 0.56 | | | | | | |
| | 0.48 | 0.70 | | | | | | |
| | 0.58 | 1.00 | | | | | | |
| | 0.69 | 1.25 | | | | | | |
| | 0.79 | 1.57 | | | | | | |
| | 1.31 | 2.63 | | | | | | |
| | 2.35 | 2.77 | | | | | | |
| l) | | | no change | | | | | |

TABLE II-continued

| | PART B | | |
|---|---|---|---|
| m) | 9.55 | 9.2 | 9.0 | — |

We claim:

1. A process for the production of an alkaline aqueous slurry having a negative charge and a solids content of at least 60% by weight, of a coated pigmentary titanium dioxide, which comprises;
   (a) providing an aqueous dispersion of pigmentary particles of titanium dioxide;
   (b) forming a coating on said particles by simultaneously precipitating in the dispersion at an alkaline pH, at least two different metal oxides, at least one of said metal oxides being selected from those giving an isoelectric point at a pH below 7 and at least one of said metal oxides being selected from those giving an isoelectric point at a pH above 7, under conditions such that a filterable, washable slurry is obtained;
   (c) filtering and washing the coated particles in the slurry to obtain a washed filter cake;
   (d) raising the concentration of the washed filter cake to at least 60% by weight of coated particles;
   (e) redispersing the particles of the raised concentration filter cake; and
   (f) maintaining the filtered, washed, coated particles at a temperature of from 40° C to 100° C for a duration of at least 20 minutes.

2. A process as claimed in claim 1 wherein the precipitation of the metal oxide coating is conducted to a final pH of from 9.0 to 10.5.

3. A process as claimed in claim 1 wherein the coating comprises at least one oxide of aluminium, beryllium, lead or zinc and at least one oxide of cerium, antimony, silicon, titanium, zirconium or tin.

4. A process as claimed in claim 3 wherein the mixed metal oxide coating comprises alumina and titania in a molar ratio of from 0.5:1 to 1.25:1.

5. A process as claimed in claim 4 wherein the mixed metal oxide coating comprises alumina and titania in substantially equal quantities on a molar basis.

6. A process as claimed in claim 1 wherein the mixed metal oxide coating comprises from 0.5 to 15% of the weight of the titanium dioxide.

7. A process as claimed in claim 1 wherein the mixed metal oxide coating is precipitated onto the titanium dioxide particles at a temperature of from 10° C to 40° C.

8. A process as claimed in claim 1 wherein the concentration of the washed titanium dioxide is raised to at least the desired product concentration by filtering the coated titanium dioxide, drying a proportion of the coated titanium dioxide and blending the dried titanium dioxide with at least a portion of the remainder of the coated titanium dioxide.

9. A process as claimed in claim 1 wherein the desired product concentration is from 60% to 75% by weight solids.

10. A process as claimed in claim 1 wherein said temperature is from 80° C to 100° C for at least 30 minutes without allowing the coated titanium dioxide to dry out.

11. A process as claimed in claim 1 wherein said maintaining is conducted so as to reduce the isoelectric point of the slurry by at least 1.0.

12. A process as claimed in claim 11 wherein the isoelectric point of the maintained slurry is from 4.5 to 5.9.

13. A process for preparing a high solids content, alkaline, negatively charged, aqueous slurry of a metal oxide coated titanium dioxide pigment suitable for direct incorporation into an aqueous paint or paper media, which comprises;
   providing an alkaline, filtered, washed aqueous slurry of at least 60 percent by weight of a pigmentary titanium dioxide coated by precipitation of a mixture of hydrous metal oxides, at least one of said oxides being selected from those giving an isoelectric point at a pH above 7 and one being selected from those giving an isoelectric point at a pH below 7; and
   heating said slurry to a temperature of from 40° C to 100° C for a period of at least 20 minutes.

* * * * *